United States Patent
Cook

(10) Patent No.: US 12,216,795 B2
(45) Date of Patent: *Feb. 4, 2025

(54) SYSTEM AND METHOD OF FILTERING CONSUMER DATA

(71) Applicant: Early Warning Services, LLC, Scottsdale, AZ (US)

(72) Inventor: Michael Cook, Wimberley, TX (US)

(73) Assignee: Early Warning Services, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,773

(22) Filed: Nov. 2, 2023

(65) Prior Publication Data

US 2024/0143833 A1 May 2, 2024

Related U.S. Application Data

(63) Continuation of application No. 17/678,502, filed on Feb. 23, 2022, now Pat. No. 11,841,974, which is a
(Continued)

(51) Int. Cl.
*G06F 21/62* (2013.01)
*G06F 16/13* (2019.01)
(Continued)

(52) U.S. Cl.
CPC .......... *G06F 21/6245* (2013.01); *G06F 16/13* (2019.01); *G06F 16/245* (2019.01); *G06Q 20/027* (2013.01); *G06Q 20/34* (2013.01)

(58) Field of Classification Search
CPC .... G06F 21/6245; G06F 16/13; G06F 16/245; G06Q 20/34; G06Q 20/027
See application file for complete search history.

(56) References Cited

U.S. PATENT DOCUMENTS

| 6,591,355 B2 | 7/2003 | Schuster et al. |
| 7,380,120 B1 | 5/2008 | Garcia |

(Continued)

FOREIGN PATENT DOCUMENTS

| CN | 103338225 A | 10/2013 |
| EP | 2651072 A2 | 10/2013 |

(Continued)

OTHER PUBLICATIONS

Advisory Action issued in U.S. Appl. No. 14/565,300, dated Jan. 22, 2019 in 4 pages.
(Continued)

*Primary Examiner* — Baotran N To
(74) *Attorney, Agent, or Firm* — Kilpatrick Townsend & Stockton LLP

(57) ABSTRACT

A system may include an interface configured to couple to a network, and includes a processor and a memory accessible to the processor. The memory may be configured to store instructions that, when executed, cause the processor to process search results corresponding to multiple data owners to selectively filter personally identifiable information (PII) associated with one or more consumers from the set of search results according to data sharing permissions for each of the data owners to produce filtered results. The instructions may further cause the processor to provide the filtered results to a user device through the network.

20 Claims, 5 Drawing Sheets

Related U.S. Application Data continuation of application No. 16/725,671, filed on Dec. 23, 2019, now Pat. No. 11,281,798, which is a continuation of application No. 14/565,300, filed on Dec. 9, 2014, now Pat. No. 10,546,149.

(60) Provisional application No. 61/914,321, filed on Dec. 10, 2013.

(51) Int. Cl.
*G06F 16/245* (2019.01)
*G06Q 20/02* (2012.01)
*G06Q 20/34* (2012.01)

(56) References Cited

U.S. PATENT DOCUMENTS

| | | | |
|---|---|---|---|
| 7,600,129 B2 | 10/2009 | Libin et al. | |
| 7,739,583 B2 | 6/2010 | Barrus et al. | |
| 7,783,980 B1 | 8/2010 | Herold | |
| 7,831,199 B2 | 11/2010 | Ng et al. | |
| 8,385,385 B2 | 2/2013 | Michaels et al. | |
| 8,428,104 B2 | 4/2013 | Michaels et al. | |
| 8,521,778 B2 | 8/2013 | James et al. | |
| 8,560,456 B2 | 10/2013 | Williams | |
| 10,546,149 B2* | 1/2020 | Cook | G06F 16/13 |
| 10,769,296 B2* | 9/2020 | Cook | G06Q 30/06 |
| 11,281,798 B2* | 3/2022 | Cook | G06F 16/13 |
| 11,841,974 B2* | 12/2023 | Cook | G06F 21/6245 |
| 2002/0049907 A1 | 4/2002 | Woods et al. | |
| 2005/0131757 A1 | 6/2005 | Chan et al. | |
| 2006/0123461 A1 | 6/2006 | Lunt et al. | |
| 2008/0189617 A1 | 8/2008 | Covell et al. | |
| 2009/0055431 A1 | 2/2009 | Brodie et al. | |
| 2009/0204645 A1 | 8/2009 | Machida et al. | |
| 2010/0036967 A1 | 2/2010 | Caine et al. | |
| 2010/0132044 A1 | 5/2010 | Kogan et al. | |
| 2011/0066606 A1 | 3/2011 | Fox et al. | |
| 2011/0312303 A1 | 12/2011 | Brush et al. | |
| 2012/0017266 A1 | 1/2012 | DiChiara et al. | |
| 2012/0072723 A1 | 3/2012 | Orsini et al. | |
| 2012/0215812 A1 | 8/2012 | Gilstrap et al. | |
| 2012/0291102 A1 | 11/2012 | Cohen | |
| 2012/0291103 A1 | 11/2012 | Cohen | |
| 2013/0346385 A1 | 12/2013 | Kraftsow et al. | |
| 2015/0161210 A1 | 6/2015 | Cook et al. | |
| 2015/0193638 A1 | 7/2015 | Cook et al. | |
| 2016/0098566 A1 | 4/2016 | Patil et al. | |
| 2020/0210616 A1 | 7/2020 | Cook et al. | |
| 2020/0372177 A1* | 11/2020 | Cook | G06Q 30/06 |
| 2022/0284120 A1 | 9/2022 | Cook et al. | |

FOREIGN PATENT DOCUMENTS

| | | |
|---|---|---|
| WO | 03071446 A1 | 8/2003 |
| WO | 2004013725 | 2/2004 |
| WO | 2004066076 A2 | 8/2004 |
| WO | 2010113484 A1 | 10/2010 |
| WO | 2012035588 A1 | 3/2012 |
| WO | 2012040231 A2 | 3/2012 |

OTHER PUBLICATIONS

Final Office Action issued in U.S. Appl. No. 14/565,300, dated May 25, 2017 in 14 pages.
Final Office Action issued in U.S. Appl. No. 14/565,300, dated Jul. 3, 2018 in 23 pages.
Non-Final Office Action issued in U.S. Appl. No. 14/565,300, dated Oct. 21, 2016 in 14 pages.
Non-Final Office Action issued in U.S. Appl. No. 14/565,300, dated Jan. 11, 2018 in 22 pages.
Non-Final Office Action issued in U.S. Appl. No. 14/565,300, dated Mar. 28, 2019 in 23 pages.
Notice of Allowance issued in U.S. Appl. No. 14/565,300, dated Sep. 18, 2019 in 9 pages.
Final Office Action issued in U.S. Appl. No. 16/725,671, dated Oct. 18, 2021 in 7 pages.
Non-Final Office Action issued in U.S. Appl. No. 16/725,671, dated Jun. 9, 2021 in 8 pages.
Notice of Allowance issued in U.S. Appl. No. 16/725,671, dated Nov. 12, 2021 in 7 pages.
Non-Final Office Action issued in U.S. Appl. No. 17/678,502, dated Jan. 20, 2023 in 7 pages.
Notice of Allowance issued in U.S. Appl. No. 17/678,502, dated Aug. 2, 2023 in 7 pages.
McCallister et al., "Guide to Protecting the Confidentiality of Personally Identifiable Information (PII)", National Institute of Standards and Technology (NIST), U.S. Department of Commerce, Apr. 6, 2010 in 59 pages.

* cited by examiner

SYSTEM AND METHOD OF FILTERING CONSUMER DATA

CROSS-REFERENCE TO RELATED APPLICATION(S)

This application is a continuation of U.S. Non-Provisional patent application Ser. No. 17/678,502, filed Feb. 23, 2022, entitled "SYSTEM AND METHOD OF FILTERING CONSUMER DATA," which is a continuation of U.S. Non-Provisional application Ser. No. 16/725,671, filed Dec. 23, 2019, now U.S. Pat. No. 11,281,798, issued Dec. 23, 2019, entitled "System And Method Of Filtering Consumer Data," which is a continuation of U.S. Non-Provisional application Ser. No. 14/565,300, filed Dec. 9, 2014, now U.S. Pat. No. 10,546,149, issued Jan. 28, 2020, entitled "System And Method Of Filtering Consumer Data," which claims priority to U.S. Provisional Patent Application No. 61/914,321, filed Dec. 10, 2013, entitled "SYSTEM AND METHOD OF FILTERING CONSUMER DATA," which are incorporated herein by reference in their entirety.

FIELD

This disclosure generally relates to consumer data filtering systems.

BACKGROUND

Consumer information is widely available, and various organizations capture, store, and sometimes resell such information. The escalation of security breaches involving personally identifiable information (PII) has contributed to the loss of millions of records over the past few years. Such security breaches involving PII may be hazardous both to individuals and to organizations. Individual harms may include identity theft, embarrassment, blackmail, damage to personal credit ratings, and so on. Organizational harms may include a loss of public trust, legal liability, remediation costs, and so on.

The term "PII data" as used herein refers to any information about an individual that may be maintained by an entity, including any information that can be used to distinguish or trace an individual's identity, such as name, social security number, date and place of birth, mother's maiden name, biometric records, and the like. Further, the term "PII data" as used herein may include any other information that can be linked to an individual, including medical data, educational data, financial data, employment data, salary data, other information, or any combination thereof. Examples of the PII data may include, but are not limited to, the individual's name data, including the full name, maiden name, mother's maiden name, or alias; the individual's personal identification number, such as social security number (SSN), passport number, driver's license number, taxpayer identification number, financial account number, or credit card number; the individual's address information, such as street address, work address, or email address; information identifying property owned by the individual, such as vehicle registration number or title number and related information; the individual's personal characteristics, including photographic images (including the individual's face or other identifying characteristic(s)), fingerprints, handwriting, or other biometric data (e.g., retina scan, voice signature, facial geometry, and the like); and information about the individual that may be linked to one of the above (e.g., date of birth, place of birth, race, religion, weight, activities, geographical indicators, employment information, medical information, education information, financial information).

SUMMARY

In some embodiments, a system may include an interface configured to couple to a network, and includes a processor and a memory accessible to the processor. The memory may be configured to store instructions that, when executed, cause the processor to process search results corresponding to multiple data owners to selectively filter personally identifiable information (PII) associated with one or more consumers from the set of search results according to data sharing permissions for each of the data owners to produce filtered results. The instructions may further cause the processor to provide the filtered results to a user device through the network.

In another embodiment, a system may include an interface configured to communicate data to and from a network. The system may further include a processor and a memory accessible to the processor. The memory may store instructions that, when executed, cause the processor to receive search results including personally identifiable information (PII) and lender identifiable information (LII). Each search result may include a data owner and corresponding data sharing permissions defined by the data owner. The memory may further store instructions that, when executed, cause the processor to process the search results to selectively alter at least a portion of one of the PII and the LII to produce filtered search results and to provide the filtered search results to a device via the network.

In yet another embodiment, a method may include receiving a request for data from a device and retrieving search results from at least one data source in response to the query. Each search result may include associated data sharing permissions. The method may further include processing the search results to selectively filter at least one of personally identifiable information (PII) and lender identifiable information (LII) from the search results to produce filtered search results according to the associated data sharing permissions. Further, the method may include providing the filtered search results to the device.

BRIEF DESCRIPTION OF THE DRAWINGS

In the following discussion, reference numerals may be reused to refer to the same or similar elements within the various figures.

DETAILED DESCRIPTION

Figure 1:
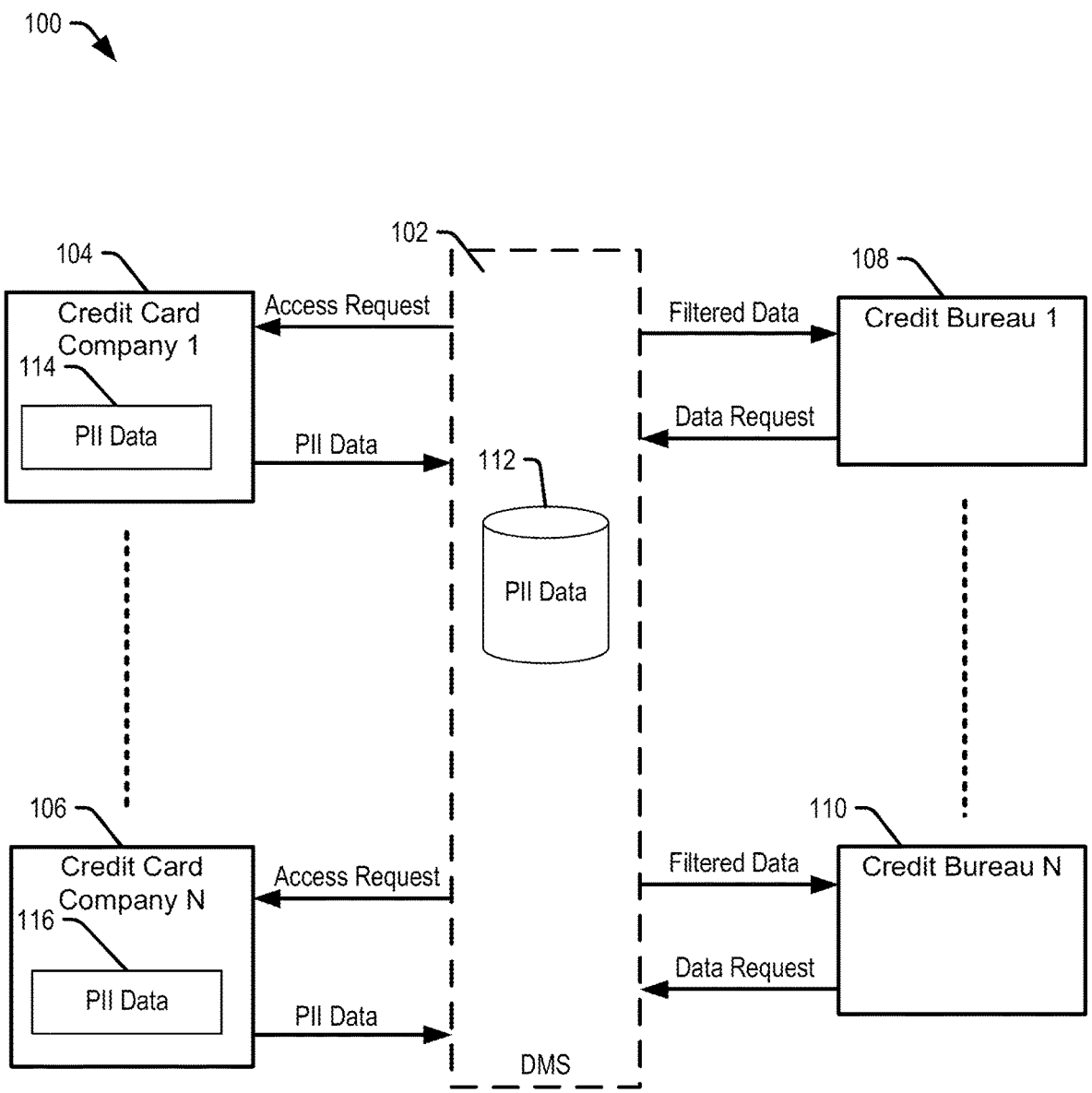
FIG. 1 is a block diagram of a system including a data management system to filter consumer data according to some embodiments.

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with various embodiments, the methods and functions described herein may be implemented as one or more software programs running on a computing device, such as a tablet computer, smartphone, personal computer, server, or any other computing device. Dedicated hardware implementations including, but not limited to, application specific integrated circuits, programmable logic arrays, and other hardware devices can likewise be constructed to implement the methods and functions described herein. Further, the methods described herein may be implemented as a device, such as a computer readable storage medium or memory device, including instructions that when executed cause a processor to perform the methods.

The protection of PII data and the overall privacy of information are concerns both for individuals whose personal information is at stake and for organizations that may be liable or have their reputations damaged should such PII data be inappropriately accessed, used, or disclosed. In some instances, Federal Laws require collection of certain PII data. However, full data records are not always necessary, such as for some forms of research, resource planning, and examinations of correlations and trends, marketing, and so on. Further, though federal laws require reporting of certain portions of the PII data to the credit bureaus, once such information is provided, the source of the information (i.e., the collecting organization) can no longer exercise control over how such information may be used. In fact, credit bureaus may repackage and sell PII data to other companies. As a result, for example, a first credit card company's reporting of its PII data may result in another credit card company using the PII data to target the first company's card holders. More generally, the PII data can be poached by competitors and by unauthorized recipients and used for marketing, behavior monitoring, or even identity theft.

Embodiments of systems and methods are described below that include a data management system (DMS) that is configured to store PII data associated with a data source and to allow an owner of PII data to define data sharing permissions (or rules) for its data. In some embodiments, the DMS may be configured by a user associated with the data source to apply data sharing parameters. In some embodiments, the DMS may convert the PII data into de-identified data based on the data sharing permissions so that the de-identified data may be shared without revealing identifying data about a particular individual. In an example, the de-identified data may include data that has some of the PII data removed or obscured (masked or obfuscated), such that the remaining data does not identify and cannot be used to identify an individual. In some embodiments, the de-identified information can be re-identified (rendered distinguishable) by using a code, algorithm, or pseudonym that is assigned to individual records, such as an unique identifier that can be assigned to each record, such as a record serial number within a database. Additionally, in some embodiments, the DMS may be configured to de-identify the source of the PII data, such as by obscuring, removing or otherwise rendering the lender's name inaccessible. One possible embodiment of a system including a DMS to limit access to the PII data is described below with respect to FIG. 1.

FIG. 1 is a block diagram of a system 100 adapted to filter consumer data according to some embodiments. The system 100 may include a data management system (DMS) 102 that may be logically situated between credit card companies 104 and 106 and credit bureaus 108 and 110. It should be understood that the DMS 102 may be a system accessible by data owners, such as credit card companies 104 and 106, and credit bureaus 108 and 110 through a network, such as the Internet. The DMS 102 may operate as a data interchange between data sources, such as the credit card companies 104 and 106, and the credit bureaus 108 and 110. In some embodiments, the DMS 102 may allow data sources to define data sharing permissions, and the DMS 102 may selectively limit access to portions of the data of the data owner according to the data sharing permissions. In some embodiments, the DMS 102 may allow a data owner to retain control over its data while allowing some data sharing.

In an example, each credit card company 104 and 106 stores data corresponding to its customers, including PII data. Each credit card company 104 and 106 has its own PII data 114 and 116, respectively. The PII data 114 corresponds to PII associated with the customers of the credit card company 104, and the PII data 116 corresponds to the PII associated with the customers of the credit card company 106. The credit card companies 104 and 106 may provide financial information about their customers to the credit bureaus 108 and 110.

In some embodiment, instead of sharing the PII data 114 and 116 directly with the credit bureaus 108 and 110, the credit card companies 104 and 106 may provide their PII data 114 and 116, respectively, to the DMS 102. The DMS 102 can store their PII data 114 and 116 in a PII database 112. In some embodiments, the DMS 102 may store the PII data 114 and 116 in a separate data warehouse that may be managed by a third-party and for which the DMS 102 may serve as the front end.

In some embodiments, the credit bureaus 108 and 110 may request credit information from the DMS 102 (or from the credit card companies 104 and 106). Such a request may be in the form of a soft credit pull, which may be looking at a potential consumer's credit score based on name only or based on name and address information, but without the consumer's specific authorization. In some embodiments, the requesting party, such as credit bureau 108, may submit a query defining a set of parameters. In some embodiments, the set of parameters may define characteristics of a desired consumer.

In response to a request, the DMS 102 may search the PII database 112 to identify results corresponding to the request, may filter the results according to the data sharing permissions, and may provide the filtered results that correspond to the request without revealing the PII data. In an example, the DMS 102 may filter, alter or remove a portion of the PII data, such as the social security number, full name, date of birth, mailing address, phone number, email address, employer data, account numbers, or any combination thereof from the search results to produce filtered data before supplying the filtered data to the credit bureau 108 or to a different requester. In some embodiments, the DMS 102 may filter the PII data and may also filter the LII data associated with the particular consumer.

In some embodiments, the credit bureau 110 may send a request to the DMS 102 on behalf of a lender. In response to the request, the DMS 102 may retrieve the PII data that corresponds to the request and filter the retrieved PII data to produce the filtered data, which may be provided to the requesting credit bureau 110. The credit bureaus 110 may then provide the filtered data to a requesting lender, in whole or in part, or may provide an analysis of the filtered data to the requesting lender. In some embodiments, the DMS 102 may filter LII data, such as the lender's name, loan amount, other loan information, other information, or any combination thereof from the filtered data as well.

The DMS 102 can be a secure system, and may encrypt a consumer's PII data prior to storing the data in the PII database 112. In some embodiments, certain portions of the information such as consumer's name, address, or telephone number may be stored in an unencrypted form. The PII database 112 may include consumer information, including PII data as well as credit information reported by lenders (e.g. banks, credit card companies, mortgage brokers, auto financiers, and so forth) corresponding to how a particular consumer performs on a loan. Some of such information may be encrypted prior to storage in the PII database 112.

In some embodiments, a lender may provide the data to the DMS 102 and may configure one or more data sharing parameters to limit access to at least some of the information within a line of trade or tradeline, which may include reported credit information, PII data, and information corresponding to the lender providing the tradeline. For example, the tradeline may include PII data, such as a consumer's name, social security number, home address, or his or her credit information, other PII data, other information, or any combination thereof. The tradeline may also include the lender's name, the type of lender, portfolio type, member (subscriber) number, other information, or any combination thereof. In some embodiments, a lender may choose to have the tradeline information anonymized by selectively removing or altering the lender identifying information (LII) of the record or other portions of the tradeline information. In some embodiments, the DMS 102 can be configured to remove the LII data from the tradeline based on the data sharing parameters configured by the data owner, such as the lender. In some embodiments, the DMS 102 can place a non-identifying term or placeholder in a field corresponding to the name of the lender in the record (which non-identifying term or placeholder may perform an anonymizing function). In an example, a lender's name may be "Bank of Money," and a particular tradeline may include the LII. The lender may configure data sharing parameters of the DMS 102 to anonymize information in the tradeline corresponding to "Bank of Money" entries, and the DMS 102 may remove at least some of the LII data from the tradeline based on the data sharing parameters. In some embodiments, the DMS 102 may replace the lender's name with a non-identifying term in the filtered (or scrubbed) data. Depending on the implementation, the data may be filtered by removing identifying information, replacing identifying information, scrambling identifying information, or any combination thereof. In some embodiments, the lender information or the PII data may be replaced with a pseudonym or may be removed. The pseudonym may be generated randomly and may not be derived from other related information about the individual consumer or the lender. In an embodiment, the filtered PII data may be modified in such a way that the requesting party cannot identify the consumer from the filtered data.

In some embodiments, a user may request a credit report specific to an individual consumer. In response to the request, the credit bureau 108 may query the DMS 102, which may return the PII data particular to the requester. Such a request may be authorized by the consumer during a credit application process and may include the consumer's social security number and full name. The DMS 102 can retrieve the PII data for the particular consumer and may return the PII data to the requesting party.

In some embodiments, the credit bureau 108 may transmit a request that includes a set of parameters or variables that may be applied to identify potential consumers. Such variables may include a credit score threshold, zip code (or other location identifying information), home ownership information (e.g., own or rent), income threshold, etc. In response to such a request, the DMS 102 may retrieve data corresponding to the parameters from the PII database 112 and may filter the PII data to remove or replace some of the information to produce filtered (scrubbed) data before providing the filtered data to the credit bureau 108.

In some embodiments, the DMS 102 may filter or otherwise alter the PII data by removing or obscuring account numbers, names, social security numbers, and any other PII from a set of retrieved records to produce filtered data. Additionally, the DMS 102 may filter LII data from the results to produce the filtered data. In some embodiments, the DMS 102 may "anonymize" the PII data by replacing portions of the filtered data with a code or other random data for which no correlation exists, making it impossible to relate the filtered data to a specific consumer. In one example, the DMS 102 may generalize the data by making the information less precise (e.g., by grouping continuous values, rounding values, etc.). In another example, the DMS 102 may delete portions of the data. In still another example, the DMS 102 may add make small changes to selected portions of the filtered data. In another example, the DMS 102 may exchange selected data of one record with data from another record, such as by switching cities, states and zip codes, etc. In still another example, the DMS 102 may replace a selected data value with an average value for the entire group of data. Thus, the DMS 102 can anonymize the PII data and make the filtered data available for useful purposes without releasing the PII data. Similarly, the DMS 102 may also anonymize the LII data. In some embodiments, the data may include medical data, for example, and the DMS 102 can filter PII data from the medical data to produce filtered medical information without the names and without other identifying information, including pseudorandom data in place of such identifying information.

In some embodiments, filtered information can be aggregated for the purposes of statistical analysis, such as making comparisons, analyzing trends, or identifying patterns. An example is the aggregation and use of multiple sets of filtered data for evaluating loan programs. The filtered data may describe characteristics of loan holders, such as age, gender, region, and outstanding loan balances, without including names, addresses, phone numbers or other identifying information. With such a dataset, an analyst could perform statistical analysis regarding demographics, income level, and so on, but without having access to sensitive consumer data. Credit card companies 104 and 106 may be more willing to share data for analysis if they can maintain control of the subsequent use of the data such as by removing the PII data prior to dissemination. Although the original dataset of the PII database 112 includes the PII data for each consumer, the filtered data would not contain personally identifiable data for any individual.

In some embodiments, the anonymized information may be used for system testing. Systems that are newly developed, newly purchased, or upgraded may require testing before being introduced for their intended production (or live) environment. Testing may simulate real conditions as closely as possible to ensure that the new or upgraded system runs correctly and handles the projected system capacity effectively. If the PII data is used in the test environment, it is required to be protected at the same level that it is protected in the production environment, which can add significantly to the time and expense of testing the system. However, anonymized data need not be protected to the same degree. In place of the PII data or in place of the biometric portion of the already anonymized data, randomly generated fake data may be combined with the anonymized data to produce test data that may be used to effectively test the system such as a database, a search system, other systems, or any combination thereof.

Additionally, the DMS 102 may capture and store information related to data requests. In some embodiments, data owners, such as the credit card companies 104 and 106, may want to learn who is accessing their PII data and what portions of their PII data are being shared. DMS 102 may provide log data to the lenders for their own analysis. The logged data can include the name of the lender, type of lender, and date and time the customer data was accessed, etc. Inquiries submitted to the DMS 102 may be logged. Such logged data may be accessed on demand. Alternatively, the DMS 102 may notify the data owner of such requests periodically (such as on a daily, weekly, monthly, quarterly, or other periodic basis).

Further, in some embodiments, the data owner, such as the credit card company 104, can restrict access to portions of its PII data, allowing the sharing of such information only when the requester is willing to pay a fee for the data. In particular, the data owner may configure the data sharing parameters for its data to limit access to the data according to a fee structure.

The DMS 102 may provide an interface to a requesting device informing the requester that access to portions of the data may require payment. Further, the interface may include payment options to allow the requester to elect to purchase the data. The requester may opt to pay for access to select portions of the data. In some embodiments, a transaction royalty can be paid to the data owner whose customer's data was returned in response to the data request. In some embodiments, the total royalty payment may be capped at a predetermined value, regardless of how many how many of the data owner's customers were listed in the return data for an inquiry. The payout to each data owner can be apportioned according to the number of hits. If more than one data owner contributed to the set of search results, the payout may be apportioned according to the number of hits for each of the data owners, according to the number of hits attributable to the each data owner or based on a percentage of the hits attributable to each data owner.

Additionally, the DMS 102 makes it possible for each data owner to configure its own rates independent of other data owners. For example, the credit card company 104 may configure the DMS 102 to charge a first royalty amount for portions of its data, and the credit card company 106 may configure the DMS 102 to charge a second royalty amount for portions of its data. In another example, both credit card companies 104 and 106 define a royalty of $0.005 per returned result. When a requester posts an inquiry to the DMS 102, the DMS 102 may retrieve overlapping data from one or more data sources. When just one lender returns the data, that lender can receive the entire fee of $0.005. However, when two, three, our four lenders return a match, the payout may be a fraction of the amount, such as $0.0025, $0.0017, and $0.0013, respectively.

In some embodiments, the data owners may provide their data to the DMS 102 and may configure data sharing permissions for their data (independent of one another). Subsequently, the DMS 102 may retrieve portions of the data and apply the data sharing permissions to selectively restrict access to the data, allowing the data owner to maintain some control over dissemination of its data, and in some instances, to be reimbursed for such access. In some embodiments, the DMS 102 may produce an executable, such as a binary executable or a process executable by a processor, which may be configured according to the data sharing permissions in order to filter search results prior to providing the search results to a data requester. One possible example of a system that includes such an executable file is described below with respect to FIG. 2.

Figure 2:
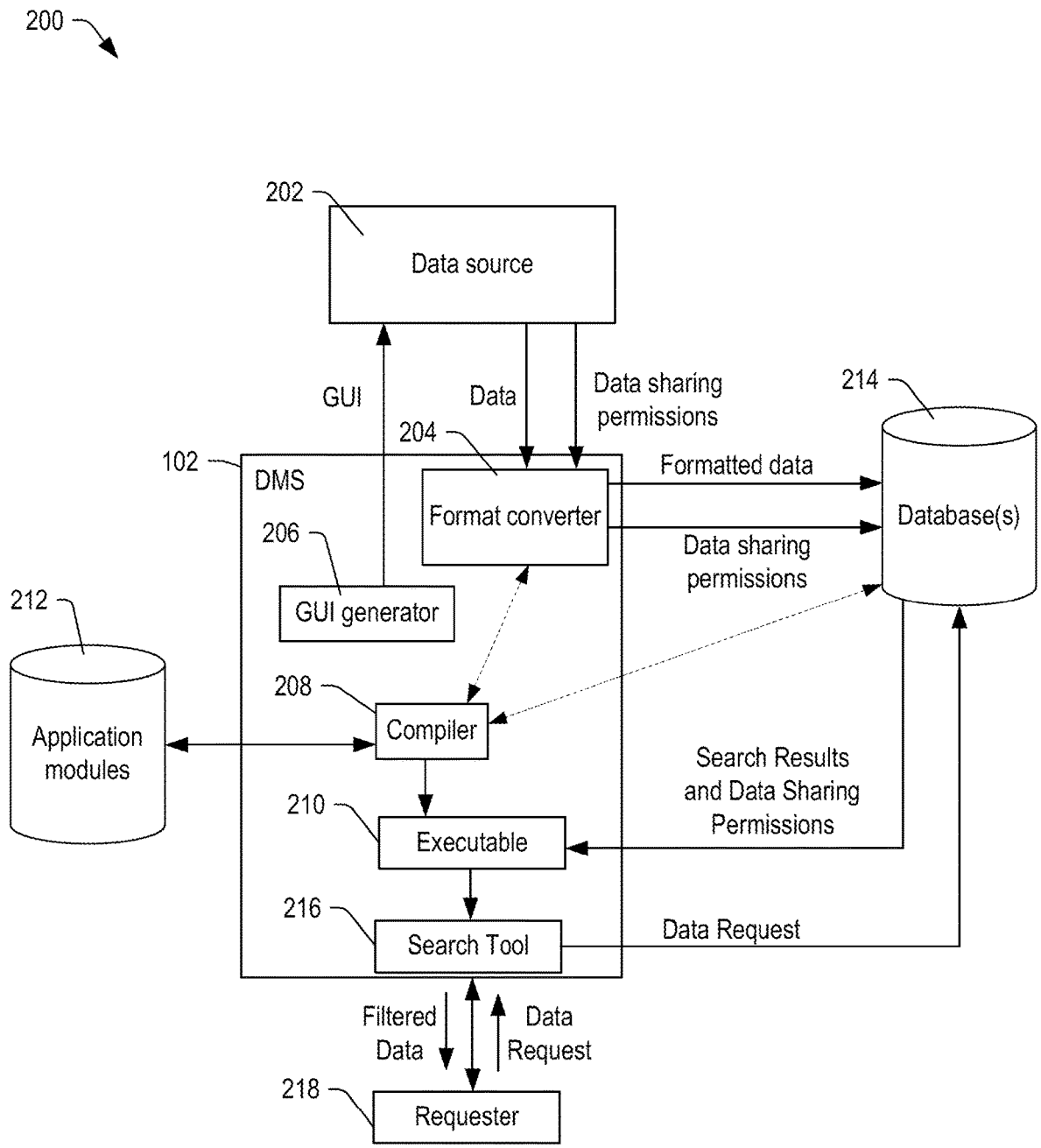
FIG. 2 is a block diagram of the system of FIG. 1 including an expanded view of the data management system according to some embodiments.

Referring to FIG. 2, a system configured to filter consumer data is generally designated 200. The system 200 can be one possible embodiment of system 100. The system 200 can include the DMS 102 and a data source 202, which may be data source 104 or 106. Further, the system 200 may include an application modules database 212. The application modules database 212 can contain instructions that define data processing techniques that correspond to the types of data being processed. The application modules database 212 can include compiled machine code, executable code, programming instructions, scripts, or any combination thereof. In some embodiments, the system 200 may include one or more databases 214 coupled to the DMS 102. The system 200 may further include the DMS 102 and a format converter 204. The DMS 102 can include a graphical user interface (GUI) generator 206, a compiler 208, an executable 210, and a search tool 216. The DMS 102 may communicate with one or more data owners, such as a data source 202, and that may communicate with one or more data requesters, such as a data requester 218.

In some embodiments, the data source 202 may provide data and data sharing permissions to the DMS 102. The format of the data from the data source 202 may be inconsistent with the data format of the database 214. For example, the data source 202 may provide dates in a "dd/mm/yyyy" format, while the one or more databases 214 may be configured to store dates in an "mm/dd/yy" format. The DMS 102 may include a format converter 204 that may be configured to convert the data to a format compatible with the one or more databases 214 and optionally to reorder the data to correspond to existing data fields within the one or more databases 214. The format converter 204 may provide the formatted (converted) data and associated data sharing permissions to the one or more databases 214.

In some embodiments, when the data is first provided to the DMS 102, an administrator of the DMS 102 may analyze the data and may generate a format converter 204 configured to convert the data from a particular data source into the appropriate format and arrangement. A unique format converter 204 may be provided for each data source so that each data source may provide data in its own format, which data may be reformatted and converted for storage in the one or more databases 214. Upon receive of data from one of the data sources, the DMS 102 may select an appropriate format converter 204 for processing of the data.

In some embodiments, the executable 210 may be generated using the compiler 208 and using selected application modules from the application modules database 212 based at least in part on the data types the data to be filtered from the one or more databases 214. The data to be filtered may be partially determined based on the service being provided. In some embodiments, the DMS 102 may retrieve selected instructions or modules from the application modules database 212 and may compile them using the compiler 208 to produce the executable 210. In some embodiments, one or more items from the application modules database 212 may be selected based on the data types within the one or more databases 214 and based on the particular type of data to be processed (e.g., financial data, medical data, and so on). The one or more databases 214 can include different data types and may store data of different categories of data (from one database to the next). For example, database "A" may store data types "X, Y, Z", while database "B" may store data types "C, D, Q, Y". Further, the one or more databases may include medical databases, financial databases, marketing databases, other databases, or any combination thereof. For the DMS 102 to provide filtered data from database "A", application modules from the application modules database 212 that pertain to data types "X, Y, and Z" may be selected and compiled by the compiler 208 to produce the executable 210. Subsequently, upon retrieval of search results from the one or more databases 214, the DMS 102 may configure the executable 210 using data sharing permissions associated with the search results and may process the search results using the configured executable 210 to filter the data according to the user-defined data sharing permissions to produce filtered data. For the DMS 102 to provide data from database "B", the DMS 102 may select a different executable 210 associated with that database (which may include application modules pertaining to data types "C, D, Q, and Y" from the application modules database 212 and compiled by the compiler 208), may configure the selected executable 210 using the data sharing permissions associated with search results from database "B", and may process the search results using the configured executable 210 to produce the filtered search results.

In some embodiments, the executable 210 may correspond to the type of data stored in at least one of the one or more databases 214. In an example, credit data including PII data may be stored in a database and the executable 210 may be compiled using application modules from the application modules database 212 that pertain to financial data and credit data, which modules may be configured to filter the credit data. In another example, medical data may be stored in the database, and the executable 210 may be compiled to filter the medical data. In some embodiments, multiple executables may be maintained by the DMS 102, where each of the multiple executables corresponds to a particular "vertical" market or to a particular type of data and corresponding data sharing permissions.

In some embodiments, the DMS 102 may be configured to automatically detect a new database. The DMS 102 may automatically inspect the data structures of the new database using a design tool to determine the data types within the database (e.g., date fields, decimal number fields, text fields, and so on), and may automatically retrieve one or more application modules from the application modules database 212 that correspond to the data types within the new database. The assembled modules may be compiled using compiler 208 (either automatically or with user involvement) to produce a new executable 210, which may be configured to filter data from the new database according to data sharing permissions stored in the database. In some embodiments, the executable 210 may be compiled automatically in response to detecting a change in the data structures of the databases 214. In other embodiments, the executable 210 may be compiled or recompiled periodically or in response to a triggering event, such as an action taken by a database administrator to initiate a compile operation. In an example, the database 214 may include a data type "D" data structure. For example, data type "D" can refer to a date. The instruction sets database 212 may include a set of instructions for filtering or otherwise processing data type "D" and may thus be compiled with other instruction modules to produce the executable 210, which then may be used to filter a single date or a date range for data according to its data sharing permissions.

In some embodiments, the DMS 102 may include a search tool 216, which may receive a data request from a requester 218, which may be a requesting device. The search tool 216 may query the one or more databases 214 to retrieve data corresponding to the request. In response to the query, the one or more databases 214 may return search results and associated data sharing permissions to the executable 210. The DMS 102 may configure the executable 210 according to the data sharing permissions and may process the search results to produce filtered data. The executable 210 can provide the filtered data to the search tool 216, which provides the filtered data to the requesting device 218.

In an example, the search results and associated data sharing permissions may include first data from a first data source having first data sharing permissions and second data from a second data source having second data sharing permissions. The DMS 102 may configure a first instance of the executable 210 with the first data sharing permissions before filtering the first data and may configure a second instance of the executable 210 with the second data sharing permissions before filtering the second data. Once the data has been processed or filtered, the DMS 102 may aggregate the first filtered data, the second filtered data, and other data to produce the search results, which may be sent to the data requester 218.

In some embodiments, the DMS 102 may filter each datum according to its associated data sharing permission to produce corresponding filtered data. In some embodiments, the DMS 102 may filter each datum according to a most restrictive one of the data sharing permissions. In some embodiments, the executable 210 may apply the data sharing permissions to filter the data, such as by excluding records, fields, non-personally identifiable information (NPI), PII, LII, portions of the data, or any combination thereof. Further, the executable 210 may apply the data sharing permissions to alter portions of the data to render the subject of the data anonymous.

In the above discussion, the executable 210 is described as embodying the instructions for performing a variety of operations for filtering data. In an alternative example, the executable 210 may be configured to access scripts, schema, instructions, or any combination thereof from application modules database 212 as needed ("on the fly") to process the retrieved data.

Figure 3:
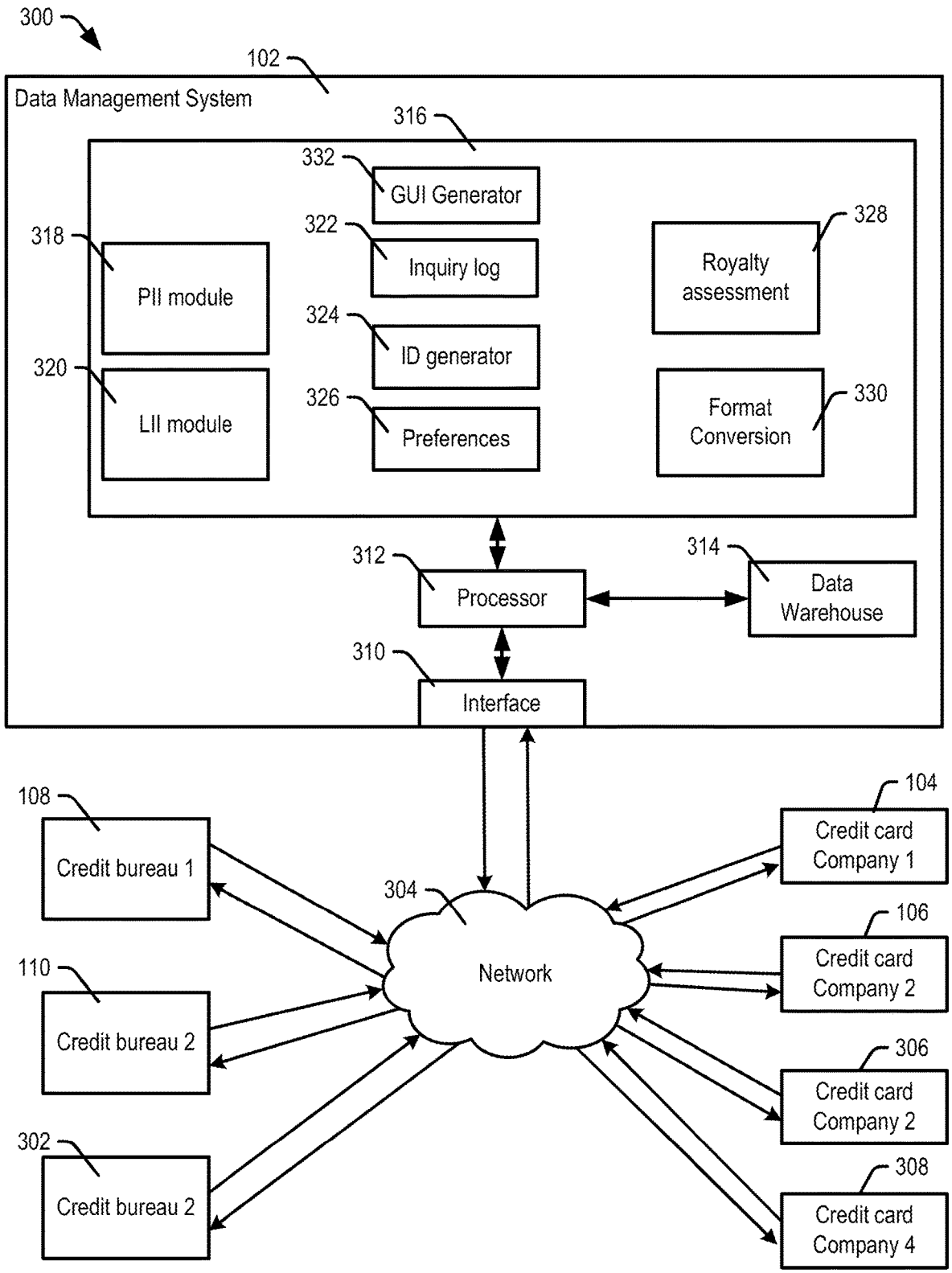
FIG. 3 is a flow diagram of a method of filtering consumer data according to some embodiments.

FIG. 3 is a block diagram of a system 300, which may include all of the elements of FIG. 1 and FIG. 2, including an expanded view of the DMS 102 according to some embodiments. The system 300 includes the DMS 102, which may communicate with the credit bureaus 108, 110, and 302 through a network 304. Additionally, the DMS 102 may communicate with the credit card companies 104, 106, 306, and 308 through the network 304. The network 304 may be a secure, private network or may an unsecured network, such as the Internet, through which the systems and companies may communicate using secure protocols.

The DMS 102 may include an interface 310 configured to communicatively couple to the network 304. The DMS 102 may further include a processor 312 coupled to the interface 310, to a data warehouse 314, and to a memory 316. The data warehouse 314 can store the PII data from one or more data sources (e.g. credit card companies 104, 106, 306, and 308) and can store LII data. In some embodiments, the data warehouse 314 may be part of the memory 316. In other embodiments, the data warehouse 314 may be separate from the memory 316 and, in some instances, separate from the DMS 102. In some embodiments, the operations of the processor 312 may be performed by one or more processors which can be located in a single computing system or may be distributed across multiple computing systems.

The memory 316 may include data and may include instructions that, when executed, cause the processor 312 to perform a variety of functions. The memory 316 can include a PII module 318 that, when executed, causes the processor 312 to selectively remove PII data from a set of search results. In some embodiments, the PII module 318 may cause the processor 312 to selectively remove portions of the PII data for each consumer, such as a full name, a birthdate, a social security number, an address, an email address, a phone number, employer information, or any combination thereof. The memory 316 may further include an LII module 320 that, when executed, causes the processor 312 to remove, obfuscate, or otherwise alter the lender identifying information (LII) prior to providing the data to the requester. In some embodiments, the PII module 318 and the LII module 320 may be combined to form the executable 210 (in FIG. 2).

The memory 316 may also include an inquiry log 322 that stores information about an inquiry, including the date and time of the transaction, the name and member number of the requesting company, the reporting lender(s) (or data owner) whose customer's data is returned, a purpose for the request (i.e., soft credit pull, hard credit pull, prospective marketing, etc.), a subscriber code, or other information or combination thereof. The inquiry log 322 may be stored in the data warehouse 314 or in a memory device. In some embodiments, data from the inquiry log 322 may be made accessible to the data source or data owner, such that the data source may be able to learn when and by whom its data is being accessed. Further, the inquiry log 322 may store information indicating the type of request (e.g., soft credit pull, etc.) and may store information about how much of the data (PII, LII, or both) was shared in response to the request.

The memory 316 further includes an identification (ID) generator module 324 that, when executed, cause the processor 312 to generate an ID and attach it to each data request. Additionally, the ID generator module 324 may cause the processor 312 to generate a pseudonym (randomly) and/or to generate replacement data for insertion in lieu of actual data within the filtered search results to be provided to the data requester. Further, the memory 316 may store preferences 326 (e.g. data sharing permissions), which may be configured by the credit card companies 104, 106, 306, and 308 to selectively control how, with whom, and under what circumstances its data may be shared. Further, the preferences 326 may include selections by the credit card companies 104, 106, 306, and 308 that specify how much a data source wants to charge for access to its data in response to certain types of queries. In some embodiments, preferences 326 may be stored in data warehouse 314 with the data to which the particular preferences pertain. In some embodiments, the preferences may include global preferences that are specific to a data source, local preferences that are specific to the particular datum, category preferences specific to the category of information, range specific corresponding to a range of data values (date, income, and so on), or any combination thereof.

The memory 316 further includes a royalty assessment module 328 having instructions that, when executed, cause the processor 312 to determine the royalty to be charged to data requesters for access to the data. The royalty assessment module 328 can be used to determine the royalty rate (from the preferences 326) for specific data to be paid based on a predetermined total royalty fee. The memory 316 may also include a format conversion module 330 that, when executed, causes the processor 312 to convert the data to a format suitable for storage in the data warehouse 314 and/or for transmission to a requesting party. The memory 316 may also include a graphical user interface (GUI) generator 332, that, when executed, causes processor 312 to generate GUIs and to provide the GUIs to the user devices, such as credit bureaus 108, 110, and 302, and credit card companies 104, 106, 306, and 308. The GUI generator 332 can be an embodiment of the GUI generator 206 in FIG. 2. The GUI generator 332 may generate an interface including a web page including user-selectable elements (such as buttons, clickable links, clickable images, pull-down menus, checkboxes, text fields, and other web page elements) and including data and/or user-selectable options. The GUI may be rendered by an Internet browser application running (executing) on a device associated with one of the credit bureaus, one of the credit card companies, another user device, or any combination thereof. In some embodiments, the GUI generator 332 may selectively present a query interface, an administrative interface, a results interface, or any combination thereof.

In some embodiments, the credit card companies 104, 106, 306, and 308 may report financial data, including PII data, to the DMS 102, periodically, upon request, according to its own schedule, or any combination thereof. The financial data may also include LII data corresponding to the source of the data. The DMS 102 may use the format conversion module 330 to process the received data into a format suitable for storage in data warehouse 314. In some embodiments, a lender, such as the credit card company 306, can upload data to the data warehouse 314. In some embodiments, the upload may be a bulk upload of the PII data from its customers to data warehouse 314 or may include the data that has changed since a previous upload of such data.

In some embodiments, one of the credit bureaus 108, 110, and 302 may send a request for financial information to DMS 102. In response to the request, the DMS 102 may retrieve a set of search results corresponding to the request. The search results may include PII information associated with one or more consumers and LII information associated with one or more lenders. The DMS 102 may selectively remove or alter at least a portion of the PII information, the LII information, other data, or any combination thereof from the set of search results according to permissions specified by the data source (data owner) that originally supplied the data within the search results. Thus, if the credit card company 104 provided the data originally, the search results that include the data from the credit card company 104 may be filtered according to the data sharing permissions specified by the credit card company 104.

In addition, data corresponding to the request and representative of the filtered results may be stored in the inquiry log 322. Further, in some embodiments, the royalty assessment module 328 may be executed to determine the royalty payable to the providing lenders according to the data sharing preferences associated with the matching data.

In an embodiment, a credit card company 104, 106, 306, or 308, may, during the normal course of business, pull a credit report on a customer or potential customer before extending credit. Credit reports can show a consumer's credit history and data indicative of the consumer's credit worthiness. The lenders may submit a credit pull request to the credit bureaus 108, 110, and 302, which may retrieve the data associated with that consumer from the DMS 102. The processor 312 can execute instructions in the ID generator 324 to assign an application identifier to the credit request. In addition, the processor 312 can retrieve data from the data warehouse 314 corresponding to the request, and can execute instructions in the PII module 318 and the LII module 320 to selectively remove portions of the data (such as portions of the PII data, portions of the LLI data, or any combination thereof) from the retrieved information, depending on the basis for the credit request (i.e., hard credit pull in response to an authorized credit application, soft credit pull for marketing purposes, and so on) and depending on the data sharing permissions. In an example, the DMS 102 may filter the PII data and the LII data when the credit request is a soft credit pull and may not filter when the credit request is a hard credit pull. The DMS 102 may selectively send the filtered data to the requesting one of the credit bureaus 108, 110, and 302, which bureau can repackage the data and can send the data back to the requesting credit card company.

Figure 4:
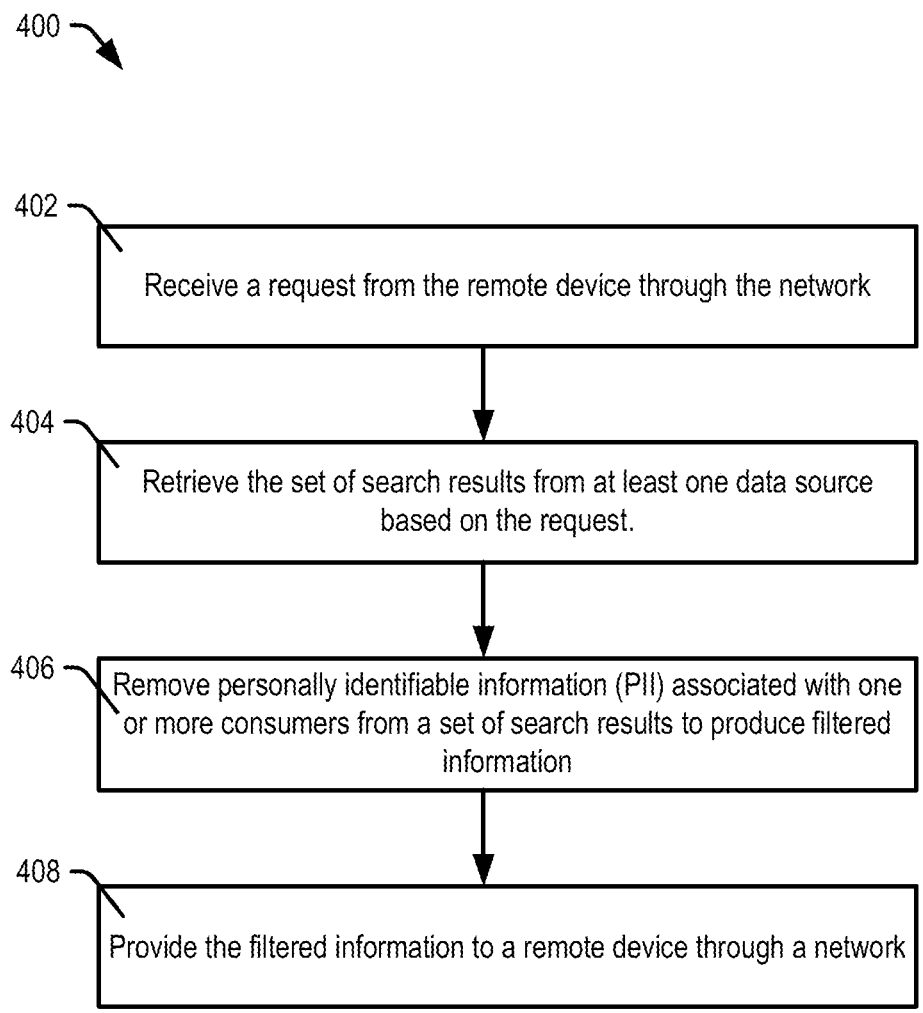
FIG. 4 is a flow diagram of a method of filtering consumer data according to some embodiments.

FIG. 4 is a flow diagram of a method 400 of providing consumer data according to an embodiment. At 402, a request is received from the remote device through the network. The DMS 102 can assign an identifier to the request. The DMS 102 can also generate a log of the request, including the requester's name or identifier, type of requester (lender, marketer, credit bureau, etc.), the date and time of the request, the type of request (soft credit pull, hard credit pull, other type of request, etc.). Advancing to 404, a set of search results may be retrieved from the data warehouse 414 by the DMS 102 based on the request. In some embodiments, the set of search results may include associated data sharing permissions or links to the data sharing permissions specific to each search result.

Continuing to 406, personally identifiable information (PII) associated with one or more consumers may be removed from the set of search results to produce filtered information. The DMS 102 may selectively remove portions of the information from the search results based on the data sharing permissions. The DMS 102 may filter information by removing portions of the data, including removing or obfuscating any information that can be used to determine an individual consumer's identity (i.e., the PII data), such as name, social security number, date and place of birth, mother's maiden name, biometric records, medical data, educational data, financial data, employment data, salary data, driver's license number, taxpayer identification number, financial account numbers, home address information, work address, or email address, the individual's personal characteristics, including race, religion, weight, activities, geographical indicators, other information, or any combination thereof. In some embodiments, the DMS 102 may also remove identifying information about the lender, such as LII data. Further, the DMS 102 may provide the PII data in total, in situations where the data is required by law or in response to a request that is made by the data owner.

Proceeding to 408, the DMS 102 can provide the filtered information (e.g., the information that corresponds to the request with removed or altered portions of the information the PII data, the LII data, or both) to a remote device through a network 304.

Figure 5:
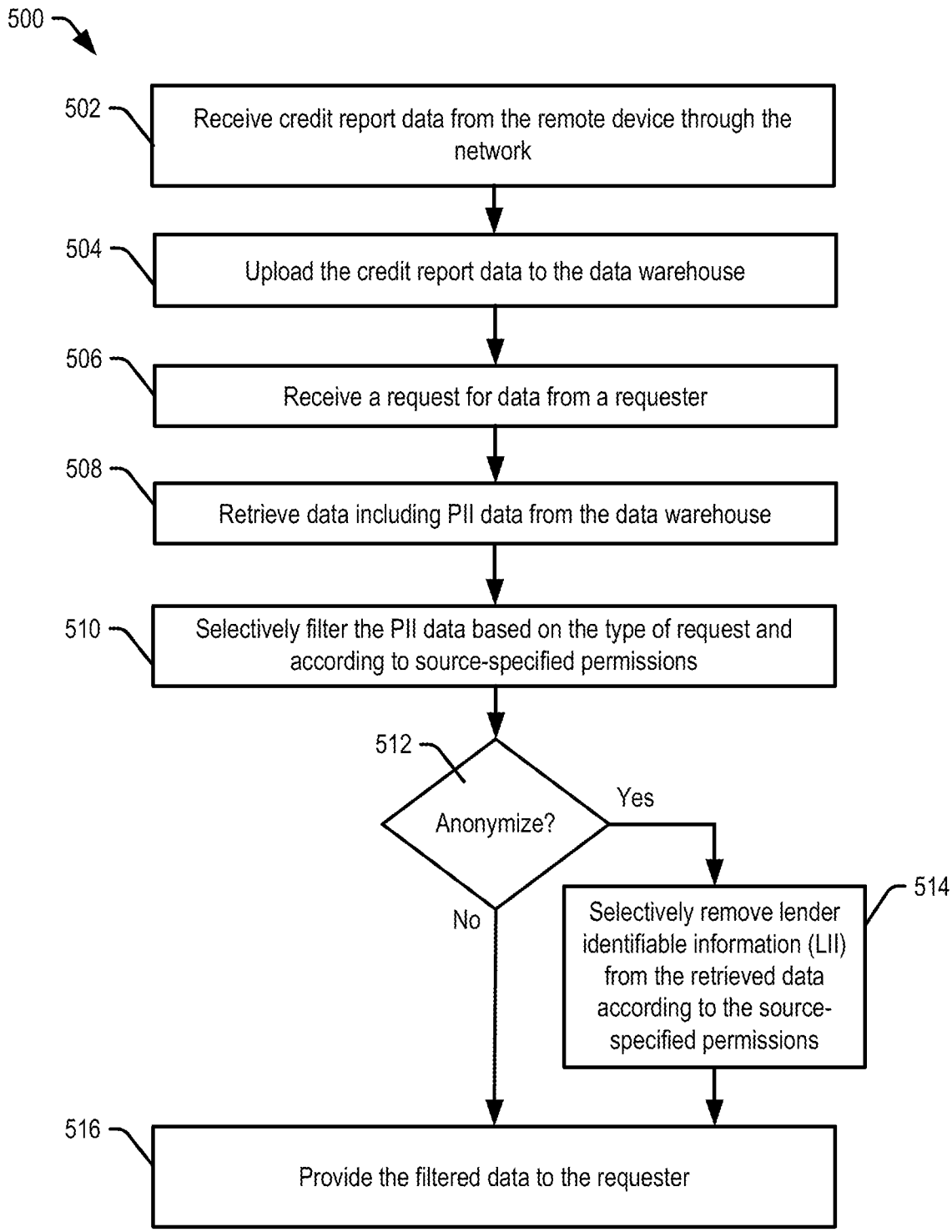
FIG. 5 is a flow diagram of a method of filtering consumer data according to some embodiments.

FIG. 5 is a flow diagram of a method 500 of providing consumer data according to an embodiment. At 502, credit report data may be received from the remote device through the network 304. The DMS 102 can upload the credit report data to the data warehouse 314, at 504. In some embodiments, the data warehouse 314 may store the credit information in a report format so that the request information may be retrieved as a completed report. In some embodiments, a formatter may format or convert the data into a format that is suitable for storage.

Advancing to 506, a request for data is received from a requester (such as a lender, a marketer, or another requester). Moving to 508, the DMS 108 may retrieve data including the PII data from the data warehouse 314. Continuing to 510, the DMS 108 may filter the PII data based on the type of request and according to data sharing permissions defined by the data owner (or data source).

In some embodiments, a lender (e.g. a credit card company, bank, mortgage broker, auto finance companies, retail stores, etc.) may configure the DMS 102, with respect to its own data, to selectively restrict access to the PII data, the LII data, or any combination thereof. In some embodiments, the DMS 102 may selectively remove or obfuscate the LII data such that the source (and/or other lender information) in the retrieved data may be removed. Proceeding to 512, the DMS 102 determines if the PII data belongs to a data source that has elected to remain anonymous. In particular, the DMS 102 retrieves the data sharing permissions and executes the permissions. If, at 512, the data source has elected anonymize its portion of the retrieved data, the method 500 advances to 514 and the DMS 102 may filter, remove, or replace the LII data from the retrieved information. It should be appreciated that the determination at 512 and the filtering at 514 may be combined with the removal or obfuscation at 510.

The method 500 continues to 516 and the DMS 102 provides the filtered data to the requester. Returning to 512, if the lender has not elected to anonymize its data, the method 500 continues to 516 and the DMS 102 provides the filtered data to the requester.

The embodiments described in in the methods 400 and 500 are but two examples of methods of providing consumer data. While the above examples were directed to credit bureaus, credit card companies and other lenders, the methods can apply to other industries, such as healthcare, wealth management (e.g. investments in stocks, bonds, annuities, commodities, and so forth), education, or other industries where it may be desirable to protect the PII of consumers or the identifying information associated with the data owner (data source), such as the LII data. The PII, other identifying information, or any combination thereof may be selectively removed from the data, such as data pertaining to health records, vaccination records, college applications, tuition statements, and so forth. Further, while the above-discussion included LII data, PII data, and other data, it should be appreciated that, in some embodiments, the LII data may be identifying data related to some other data source (data owner), such as a hospital, a brokerage firm or bank, a school, or another industry.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

The processes, machines, and manufactures (and improvements thereof) described herein are particularly useful improvements for controlling dissemination of personally identifying information (PII data), lender identifying information (LII), other data, or any combination thereof. Further, the embodiments and examples herein provide improvements in the technology of data exchange systems, and more particularly in the technology of credit reporting exchange systems. In addition, embodiments and examples herein provide improvements to the functioning of a computer by providing filtered search results with PII data, LII data, other data, or any combination thereof, thereby creating a specific purpose computer by adding such technology for filtering PII data and LII data according to a data owner's data sharing permissions, thereby allowing the data owner to control how its data can be shared. Thus, the improvements herein provide for technical advantages, such as providing a system in which a data owner can make its data available to others without sharing PII data, LII data, or other data. For example, the systems and processes described herein can be particularly useful to any systems in which a user may want to share some data while retaining control over what data and how much data will be shared. While technical fields, descriptions, improvements, and advantages are discussed herein, these are not exhaustive and the embodiments and examples provided herein can apply to other technical fields, can provide further technical advantages, can provide for improvements to other technologies, and can provide other benefits to technology. Further, each of the embodiments and examples may include any one or more improvements, benefits and advantages presented herein.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, in the flow diagrams presented herein, in certain embodiments, blocks may be removed or combined without departing from the scope of the disclosure. Further, structural and functional elements within the diagram may be combined, in certain embodiments, without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A data management system, comprising:
 a network interface;
 at least one processor; and
 a memory having instructions stored thereon that, when executed, cause the at least one processor to:
  receive, using the network interface, data sharing permissions from each of a plurality of data sources;
  receive, using the network interface, data from each of the plurality of data sources, wherein the data from each of the plurality of data sources comprises a source identifier that indicates a respective data source of the plurality of data sources from which the data was received;
  store the data on one or more databases;
  receive, using the network interface, a request for data from a computing device, the request comprising one or more criteria;
  identify a subset of data matching the one or more criteria;
  anonymize the source identifiers within a first portion of the subset of data into de-identified data based on the data sharing permissions from a first data source that provided the first portion of the subset of data; and
  send, using the network interface, the subset of data to the computing device.

2. The data management system of claim 1, wherein:
 anonymizing the source identifiers comprises one or both of removing the source identifiers and altering the source identifiers.

3. The data management system of claim 1, wherein:
 at least some of the source identifiers comprise lender identifying information (LII).

4. The data management system of claim 1, wherein:
 the instructions further cause the at least one processor to convert at least some personally identifiable information within a second portion of the subset of data into de-identified data based on the data sharing permissions from a second data source that provided the second portion of the subset of data.

5. The data management system of claim 4, wherein:
 the first data source and the second data source are the same.

6. The data management system of claim 4, wherein:
 the first portion and the second portion are the same.

7. The data management system of claim 1, wherein:
 the first portion comprises an entirety of the subset of data.

8. A method of operating a data management system, comprising:
 receiving data sharing permissions from each of a plurality of data sources;
 receiving data from each of the plurality of data sources, wherein the data from each of the plurality of data sources comprises a source identifier that indicates a respective data source of the plurality of data sources from which the data was received;
 storing the data on one or more databases;
 receiving a request for data from a computing device, the request comprising one or more criteria;

identifying a subset of data matching the one or more criteria;

anonymizing the source identifiers within a first portion of the subset of data into de-identified data based on the data sharing permissions from a first data source that provided the first portion of the subset of data; and sending the subset of data to the computing device.

9. The method of operating a data management system of claim 8, further comprising:

convert at least some personally identifiable information within a second portion of the subset of data into de-identified data based on the data sharing permissions from a second data source that provided the second portion of the subset of data.

10. The method of operating a data management system of claim 9, wherein:

the personally identifiable information within the de-identified data is de-identified by at least one of removing the personally identifiable information, masking the personally identifiable information, obfuscating the personally identifiable information, scrambling the personally identifiable information, or replacing the personally identifiable information with a pseudonym.

11. The method of operating a data management system of claim 8, further comprising:

encrypting personally identifiable information within the data prior to storing the data in the one or more databases.

12. The method of operating a data management system of claim 8, further comprising:

aggregating the subset of data with at least one additional subset of data to form aggregated data; and performing statistical analysis on the aggregated data to analyze trends within the aggregated data, identify patterns within the aggregated data, or both analyze trends and identify patterns within the aggregated data.

13. The method of operating a data management system of claim 8, further comprising:

generating logs of data requested from the first data source; and providing the logs of data to the first data source.

14. The method of operating a data management system of claim 8, wherein:

each datum of the data comprises records associated with a loan.

15. A non-transitory computer-readable medium having instructions stored thereon that, when executed by one or more processors, cause a data management system to:

receive data sharing permissions from each of a plurality of data sources;

receive data from each of the plurality of data sources, wherein the data from each of the plurality of data sources comprises a source identifier that indicates a respective data source of the plurality of data sources from which the data was received;

store the data on one or more databases;

receive a request for data from a computing device, the request comprising one or more criteria;

identify a subset of data matching the one or more criteria;

anonymize the source identifiers within a first portion of the subset of data into de-identified data based on the data sharing permissions from a first data source that provided the first portion of the subset of data; and send the subset of data to the computing device.

16. The non-transitory computer-readable medium of claim 15, wherein the instructions further cause the data management system to:

convert at least some personally identifiable information within a second portion of the subset of data into de-identified data based on the data sharing permissions from a second data source that provided the second portion of the subset of data.

17. The non-transitory computer-readable medium of claim 15, wherein:

the de-identified data is re-identifiable using a unique identifier that is assigned to each data record within the de-identified data.

18. The non-transitory computer-readable medium of claim 15, wherein:

anonymizing the source identifiers comprises one or both of removing the source identifiers and altering the source identifiers.

19. The non-transitory computer-readable medium of claim 15, wherein:

anonymizing the source identifiers comprises altering the source identifiers by replacing the source identifiers with a pseudonym.

20. The non-transitory computer-readable medium of claim 19, wherein:

the pseudonym is generated randomly by the data management system.

* * * * *